(12) United States Patent
Choi

(10) Patent No.: US 7,638,189 B2
(45) Date of Patent: Dec. 29, 2009

(54) ARTIFICIAL MARBLE CONTAINING TRANSPARENT CHIP USING CO-EXTRUSION AND PROCESS FOR PREPARING THE SAME

(75) Inventor: Sang-Hun Choi, Chungcheongbuk-do (KR)

(73) Assignee: LG Chem, Ltd. (KR)

( * ) Notice: Subject to any disclaimer, the term of this patent is extended or adjusted under 35 U.S.C. 154(b) by 91 days.

(21) Appl. No.: 11/376,054

(22) Filed: Mar. 15, 2006

(65) Prior Publication Data

US 2007/0049658 A1    Mar. 1, 2007

(30) Foreign Application Priority Data

Aug. 24, 2005    (KR)    ............ 10-2005-0077596

(51) Int. Cl.
*B32B 7/04*    (2006.01)
*B32B 5/16*    (2006.01)
*B32B 27/36*    (2006.01)
*B32B 27/30*    (2006.01)

(52) U.S. Cl. ............ 428/327; 428/218; 428/407; 428/480; 428/523

(58) Field of Classification Search ............ 523/171; 428/407, 403, 689, 402, 218, 364, 357, 212, 428/323, 319.3, 206; 264/176.1; 524/437; 359/580

See application file for complete search history.

(56) References Cited

U.S. PATENT DOCUMENTS

| | | | | |
|---|---|---|---|---|
| 4,433,070 A | * | 2/1984 | Ross et al. | 523/171 |
| 4,499,143 A | * | 2/1985 | Panush | 428/336 |
| 5,043,377 A | * | 8/1991 | Nogi et al. | 524/437 |
| 5,112,657 A | * | 5/1992 | Melber | 428/15 |
| 5,164,589 A | * | 11/1992 | Sjodin | 250/227.24 |
| 5,304,592 A | * | 4/1994 | Ghahary | 524/437 |
| 5,476,895 A | * | 12/1995 | Ghahary | 524/437 |
| 5,922,257 A | * | 7/1999 | Keesling | 264/75 |
| 5,981,628 A | * | 11/1999 | Takamoto et al. | 523/201 |
| 6,350,509 B1 | * | 2/2002 | Sada et al. | 428/212 |
| 6,548,157 B2 | * | 4/2003 | Ghahary | 428/319.3 |
| 2004/0134311 A1 | * | 7/2004 | Bruske | 75/335 |
| 2007/0166532 A1 | * | 7/2007 | Bordener | 428/323 |
| 2009/0117317 A1 | * | 5/2009 | Oh | 428/67 |

FOREIGN PATENT DOCUMENTS

| | | | |
|---|---|---|---|
| JP | 5-279575 | | 10/1993 |
| JP | 2001089213 A | * | 4/2001 |
| KR | 1020000073530 A | | 5/2000 |
| KR | 1020000046774 A | | 7/2000 |
| KR | 1020010084598 A | | 9/2001 |
| KR | 1020040005044 | | 1/2004 |
| KR | 1020050020100 A | | 3/2005 |
| WO | WO 2007/142391 | * | 12/2007 |

OTHER PUBLICATIONS

Machine translation of JP 2001089213 A.*
PCT Written Opinion of the International Searching Authority; Date of Mailing: Jun. 8, 2006; International Application No: PCT/KR2006/000732.
PCT International Search Report; International Application No: PCT/KR2006/000732; Date of Mailing: Jun. 8, 2006.

* cited by examiner

*Primary Examiner*—Callie E Shosho
*Assistant Examiner*—John Freeman
(74) *Attorney, Agent, or Firm*—Cantor Colburn LLP

(57) ABSTRACT

There are disclosed an artificial marble containing pellet-shaped transparent chips, obtained by coating the outer surface of an internal transparent resin layer with a resin layer containing a filler having a high specific gravity using co-extrusion, and a process for preparing the same. The artificial marble using the transparent chips as coloring chips, thus not causing the occurrence of layer separation of the transparent chips, which conventionally occurred in an artificial marble using transparent chips made of a single component, being distinguished from a conventional artificial marble made of combination of the single-colored chips, and expressing a pattern similar to a natural granite.

15 Claims, 2 Drawing Sheets icial marble containing (A) an artificial marble slurry at an amount of 100 parts by weight containing acrylic resin syrup at an amount of 100 parts by weight, an inorganic filler at an amount of 120~200 parts by weight, a crosslink agent at an amount of 2~10 parts by weight, and a polymerization initiator at an amount of 0.1~10 parts by weight, and (B) marble chips at an amount of 5~70 parts by weight containing acrylic resin syrup at an amount of 100 parts by weight, an inorganic filler at an amount of 100~150 parts by weight, a crosslink agent at an amount of 2~10 parts by weight, and a polymerization initiator at an amount of 0.1~10 parts by weight, wherein the mixture rate of the inorganic filler in the artificial marble slurry is higher than that in the marble chips by 20~50 parts by weight. The marble chips obtained by adding the inorganic filler to the acrylic resin, disclosed in the above Patent, are opaque, thus being incapable of imitating quartz in a natural marble or granite.

ARTIFICIAL MARBLE CONTAINING TRANSPARENT CHIP USING CO-EXTRUSION AND PROCESS FOR PREPARING THE SAME

This application claims the benefit of the filing date of Korean Patent Application No. 10-2005-0077596 filed on Aug. 24, 2005 in the Korean Intellectual Property Office, the disclosure of which is incorporated herein in its entirety by reference.

TECHNICAL FIELD

The present invention relates to an artificial marble and a process for preparing the same, and more particularly to an artificial marble containing pellet-shaped transparent chips obtained by coating the outer surface of an internal transparent resin layer with a resin layer having a high specific gravity using co-extrusion and a process for preparing the same.

BACKGROUND ART

In general, compared to a natural marble, artificial marbles made of acrylic resin have various advantages, such as a fine external appearance, a high processability, a lightweight, and a high strength, thus being widely used as materials for counter tables and other interior products. However, the artificial marbles have a limit to express a similar pattern to that of the natural marble or granite from the general combination of single-colored opaque chips.

The artificial marbles made of acrylic resin are manufactured by mixing a filler, such as aluminum hydroxide, calcium carbonate, or a silica, other pigments, and a hardening agent to a syrup mixture, which is obtained by mixing a monomer, such as methylmethacrylate, with polymethyl methacrylate, casting the mixture using forming die or a continuous steel belt, and hardening the obtained product.

In order to form a pattern and a color of the artificial marble, pigments and chips are used. The chips are generally made of the same resin as that of the artificial marble, and pigments and fillers are put into the resin composite so that the chips have the same specific gravity as a raw material composite for the artificial marble, to which the chips are applied. Then, the chips are manufactured through the same process as the artificial marble, and are crushed so that the crushed chips have various colors and particle sizes.

Specifically, when an artificial marble containing the above chips is manufactured, the occurrence of layer separation due to a difference of specific gravities between the artificial marble and the chips needs to be minimized. Thus, after the specific gravity of the chips is adjusted using an inorganic filler, such as coal or aluminum hydroxide, so that the specific gravity of the chips is equal to that of a base material of the artificial marble, various pigments are put into the resin composite for the chips. Then, the resin composite is formed in a plate shape, and is crushed into the chips. When the chips are made of acrylic resin, the chips become opaque due to the filler added to the raw material of the chips, thus being incapable of imitating quartz of natural granite or marble.

Further, when transparent chips manufactured using a transparent polymer made of a single component without the addition of a filler are applied to an artificial marble, the size and the supply amount of the chips contained in the marble are limited due to chip separation caused by a difference of specific gravities between the chips and the raw material composite for the artificial marble. Accordingly, the above transparent chips cannot imitate quartz contained in the natural marble.

Korean Patent Registration No. 491874 discloses an artificial marble containing (A) an artificial marble slurry at an amount of 100 parts by weight containing acrylic resin syrup at an amount of 100 parts by weight, an inorganic filler at an amount of 120~200 parts by weight, a crosslink agent at an amount of 2~10 parts by weight, and a polymerization initiator at an amount of 0.1~10 parts by weight, and (B) marble chips at an amount of 5~70 parts by weight containing acrylic resin syrup at an amount of 100 parts by weight, an inorganic filler at an amount of 100~150 parts by weight, a crosslink agent at an amount of 2~10 parts by weight, and a polymerization initiator at an amount of 0.1~10 parts by weight, wherein the mixture rate of the inorganic filler in the artificial marble slurry is higher than that in the marble chips by 20~50 parts by weight. The marble chips obtained by adding the inorganic filler to the acrylic resin, disclosed in the above Patent, are opaque, thus being incapable of imitating quartz in a natural marble or granite.

Accordingly, in order to overcome the above technical limitation of the conventional artificial marble, the present inventor(s) has invented an artificial marble containing transparent chips, obtained by coating transparent polymeric resin, such as acrylic resin or PET with a high specific gravity resin layer containing a filler using co-extrusion and cutting the obtained extrudate, so that the transparent chips have a specific gravity similar to that of a raw material composite for the artificial marble, thereby allowing the transparent chips to exhibit transparency like quartz or high-purity silica contained in a natural marble, and thus expressing a pattern more similar to that of the natural marble, compared to a conventional artificial marble containing chips made of opaque or semi-transparent single component.

DISCLOSURE

Technical Problem

Therefore, the present invention has been made in view of the above problems, and it is an object of the present invention to provide transparent chips applied to an artificial marble, each of which is obtained by coating the outer surface of an internal transparent resin layer with a high specific gravity resin layer containing a filler for adjusting the total specific gravity of the chips equal to that of a raw material component for the artificial marble, thereby eliminating the occurrence of layer separation.

It is an another object of the present invention to provide an artificial marble, to which the above transparent chips are applied, and a method for manufacturing the same, thereby remarkably differing from the conventional artificial marble containing opaque chips in terms of pattern and color, and being similar to a natural marble.

Technical Solution

In accordance with an aspect of the present invention, the above and other objects can be accomplished by the provision of an artificial marble containing transparent chips, each comprising an internal transparent layer; and an external layer having specific gravity higher than that of the internal transparent layer and formed on the outer surface of the internal transparent layer.

Preferably, the whole specific gravity of the transparent chips may be the same as that of a raw material composite for the artificial marble to which the transparent chips are applied, or differ from that of the raw material composite for the artificial marble by ±0.2 g/cm$^3$ or less.

The artificial marble of the present invention is characterized in that a difference of specific gravities between the transparent chips and the raw material composite for the artificial marble is minimized. Preferably, the specific gravity of the transparent chips is equal to that of the raw material composite. When the difference of specific gravities between the transparent chips and the raw material composite for the artificial marble is in the above range, chip separation does not occur.

In order to manufacture an artificial marble exhibiting transparency like quartz or high-purity silica contained in a natural marble so as to have a pattern and a color similar to those of the natural marble, the transparent chips are added to the raw material composite for the artificial marble. In order to assure the transparency of the transparent chips, a filler is not added to a base resin, such as acrylic resin. Accordingly, when the transparent chips are applied to the artificial marble, chip separation occurs due to a difference of specific gravities.

Specifically, a plastic resin has a specific gravity of 1.5 g/cm$^3$ or less, and transparent acrylic resin, for example, polymethymethacrylate (PMMA), has a specific gravity of approximately 1.17~1.20 g/cm$^3$. However, the raw material composite for the artificial marble has a specific gravity of approximately 1.4~1.8 g/cm$^3$.

As described above, there is a difference of specific gravities between the transparent resin and the raw material composite for the artificial marble. When the transparent chips are made of the above resin and are applied to the artificial marble, transparent chip separation occurs. Since a transparent polymer having a high specific gravity (more than 1.6 g/cm$^3$) does not currently exist, no artificial marble employing transparent chips exists.

In accordance with the present invention, the external layer having a high specific gravity is formed on the surfaces of the transparent chips so that a difference of specific gravities between two materials is minimized, thus allowing the transparent chips to exhibit the same effect as natural quartz without the occurrence of chip separation.

Preferably, the total specific gravity of the transparent chips is 1.3~2.0 g/cm$^3$, similar to that of the raw material composite for the artificial marble. Further, preferably, the specific gravity of the external layer is 1.5~10 g/cm$^6$, so that the total specific gravity of the transparent chips is in the above range.

The internal transparent layer has a light transmittance of 90~100%, and preferably more than 95%. Conventional chips contain a filler, such as aluminum hydroxide, thus being semi-transparent and having a light transmittance of less than 60%.

A base resin used in the internal transparent layer and the external layer is a transparent polymeric resin, such as acrylic resin (PMMA), polyester resin, and polyethylene terephthalate (PET). Preferably, the transparent chips are transparent acrylic chips using acrylic resin as the base resin.

In accordance with the present invention, the transparent acrylic chips having the high-specific gravity external layer have a high light transmittance and excellent physical properties, exhibit the same effect as natural quartz chips, and are applied to post-treatment, such as casting or polishing.

The external layer contains a filler for adjusting the specific gravity of the transparent chips, and titanium dioxide, barium sulfate, aluminum hydroxide, calcium carbonate, silica, metal powders, and metal salts are used as an appropriate filler. The specific gravity of the filler is at least 2.5 g/cm$^3$, and preferably in the range of 2.5~10 g/cm$^3$. In order to increase the specific gravity-adjusting effect per amount of the filler used, the filler has a high specific gravity.

A third layer, such as an adhesive layer or a primer layer, for improving adhesiveness between the internal transparent layer and the external layer is formed therebetween.

The internal transparent layer may contain a pearl pigment. Then, the transparent chips exhibit a pearl effect on the insides thereof as well as on the surfaces thereof, thus exhibiting a more impressive pearl effect than the conventional chips exhibiting the pearl effect only on the surfaces thereof.

The shapes of the transparent chips are not limited. For example, the transparent chips have cylindrical shapes or polyhedral shapes, such as tetrahedral and hexahedral shapes. When the transparent chips are manufactured by co-extrusion, the transparent chips have cylindrical or hexahedral shapes.

The external layer is formed in whole or in part on the outer surface of the internal transparent layer. When the transparent chips are manufactured by co-extrusion, the external layer is formed on the overall outer surface of the extrudate except for cutting planes thereof.

In consideration of the appearance effect and plasticity of the artificial marble, preferably, the transparent chips have a size of 3~20 mm and a supply amount of 1~50% by weight of the total amount of the artificial marble.

In accordance with another aspect of the present invention, there is provided a process for preparing an artificial marble comprising manufacturing transparent chips by forming an external layer having a specific gravity higher than that of an internal transparent layer on the outer surface of the internal transparent layer, and cutting and crushing the obtained product; and adding the transparent chips to a raw material composite for the artificial marble.

The specific gravity of the transparent chips is controlled by adjusting the specific gravity and the amount of a filler added to the external layer, so that the specific gravity of the transparent chips is equal to or similar to that of the raw material composite of the artificial marble.

The external layer is formed by coating, extrusion, injection, or pressing, and preferably, by co-extrusion.

In the case the external layer is formed by co-extrusion, the method comprises respectively preparing a resin composite for the internal layer and a resin composite for the external layer having a higher specific gravity than that of the resin composite for the internal layer; supplying the resin composites to an extruder and performing the co-extrusion so that the external layer is coated on the outer surface of the internal layer; and obtaining the transparent chips by cutting and crushing the extrudate.

The method may further comprise forming an adhesive layer or a primer layer between the internal layer and the external layer for improving adhesiveness therebetween.

ADVANTAGEOUS EFFECTS

In accordance with the present invention, the artificial marble, to which the transparent chips provided with the external layer having a high specific gravity is applied, expresses a similar pattern to that of a natural granite without occurrence of chip separation, compared to the conventional acrylic artificial marbles.

DESCRIPTION OF DRAWINGS

The above and other objects, features and other advantages of the present invention will be more clearly understood from the following detailed description taken in conjunction with the accompanying drawings, in which.

BEST MODE

Figure 1:
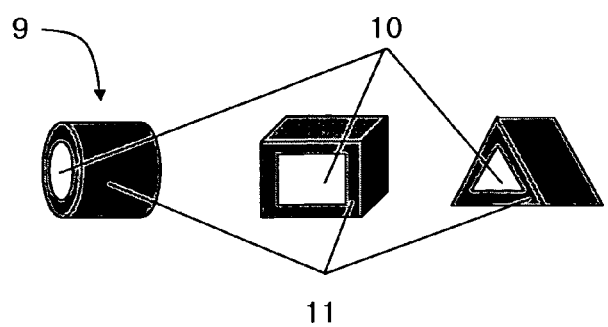
FIG. 1 is a perspective view illustrating transparent chips coated with a resin composite having a high specific gravity using co-extrusion for manufacturing an artificial marble in accordance with one embodiment of the present invention.

FIG. 1 is a perspective view illustrating transparent chips obtained by coating an internal transparent layer with a resin composite having high specific gravity using co-extrusion for manufacturing an artificial marble in accordance with one embodiment of the present invention. Each of the transparent chips 9 comprises an internal transparent layer 10 and an external high specific gravity layer 11. In order to improve the adhesiveness between the internal transparent layer 10 and the external high specific gravity layer 11, a third layer, such as an adhesive layer or a primer layer, may be formed therebetween.

As shown in FIG. 1, the transparent chips 9 have a cylindrical, hexahedral, or pentahedral shape, so that the cross sections of the transparent chips 9 in the width direction are circular, rectangular, or triangular. The shape of the transparent chips 9 may be variously modified. When the transparent chips 9 are manufactured by co-extrusion, the transparent chips 9 generally have a cylindrical or hexahedral shape.

The external high specific gravity layer 11 is formed completely or partially on the outer surface of the internal transparent layer 10. When the transparent chips 9 are manufactured by co-extrusion, as shown in FIGS. 1 and 2, the external high specific gravity layer 11 is formed on the overall outer surface of an extrudate except for cutting planes thereof.

Figure 2:
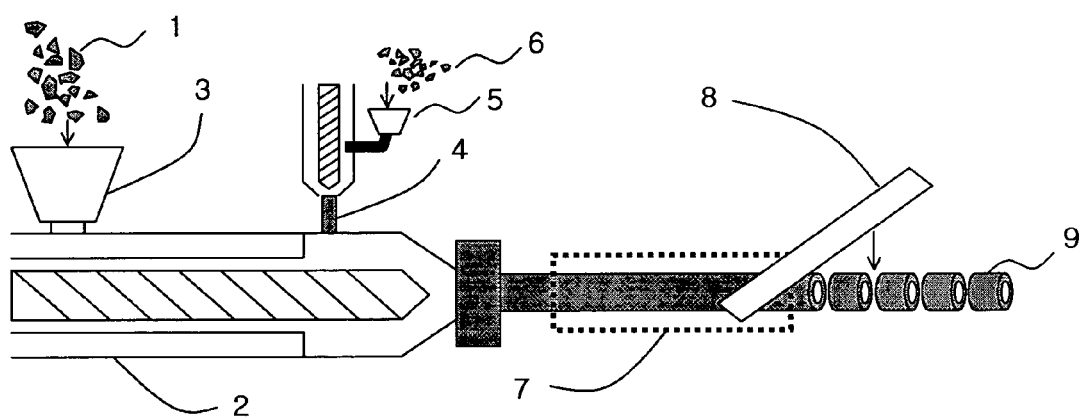
FIG. 2 is a schematic view illustrating a process for manufacturing the transparent chips in accordance with the embodiment of the present invention.

FIG. 2 is a schematic view illustrating a process for manufacturing the transparent chips in accordance with the embodiment of the present invention. The process for manufacturing the transparent chips 9 comprises co-extruding a transparent resin composite 1 made of acryl, polyester, or PET for forming an internal layer, and a high specific gravity resin composite 6 made of a transparent resin and a filler for forming an external layer, and crushing or cutting the obtained extrudate.

A co-extruder for manufacturing the transparent chips 9 comprises a main extruder 2 for forming the internal transparent layer 1, a main extruder hopper 3 through which the transparent resin composite 1 is supplied to the main extruder 2, a subsidiary extruder 4 for forming the external high specific gravity layer 11, a subsidiary extruder hopper 5 through which the high specific gravity resin composite 6 is supplied to the subsidiary extruder 4, a cooler 7 for cooling the obtained extrudate, and a blade 8 for cutting the extrudate into the transparent chips 9.

In order to manufacture the transparent chips 9 made of at least two composites having different specific gravities, the transparent resin composite 1 for forming the internal transparent layer 10 is manufactured, and the high specific gravity resin composite 6 for forming the external high specific gravity layer 11 is manufactured. The transparent resin composite 1 contains a transparent polymer having a light transmittance of 90% or more, such as acrylic resin, at an amount of 100 parts by weight, a release agent for co-extrusion at an amount of 0.1~1 parts by weight, and a pearl pigment, if necessary. The high specific gravity resin composite 6 contains the same transparent polymer as that of the transparent resin composite 1 at an amount of 100 parts by weight, and a filler or metal powder having high specific gravity for adjusting the specific gravity of the transparent chips 9 at an amount of 0.1~200 parts by weight. When a polymeric resin is used through co-extrusion, a crosslink agent and a polymerization initiator are not used. The pigment may be added, if necessary.

The filler or metal powder having high specific gravity has a particle size of 10~200 μm. The filler uses titan dioxide or metal salt having a specific gravity of 2.5 or more, and the metal powder uses inorganic powder having a specific gravity of 2.5 or more, which is made of copper or iron. That is, any metal powder or metal salt, which has a specific gravity of 2.5 or more, may be used as the filler. The higher specific gravity the filler has, the more effectively the external high specific gravity layer 11 coats the internal transparent layer 10 at a small volume of the filler for adjusting the specific gravity, thus exhibiting an improved effect.

In order to satisfy the above condition, the filler uses titan dioxide, barium sulfate, or general metal salts, and the metal powder uses copper powder, or zinc powder.

General polymeric composites exhibiting a transparent effect, such as PMMA and PET, are used as a resin for manufacturing the transparent chips 9. Preferably, acrylic resins having improved physical properties including transparency are used to manufacture the transparent chips 9.

Thereafter, the composites 1 and 6 having different specific gravities are co-extruded through the co-extruder. Here, the co-extrusion is performed at a temperature of 200~300° C. and a velocity of 1~20 m/min.

The transparent resin composite 1 is supplied to the main extruder 2 through the main extruder hopper 3, thus forming the internal transparent layer 10. The high specific gravity resin composite 6 containing the filler or metal powder having a high specific gravity is supplied to the subsidiary extruder 4 through the subsidiary extruder hopper 5, thus forming the external high specific gravity layer 11.

A general extruder is used as the main extruder 2. The main extruder 2 has an extrusion temperature of 200~300° C. and an extrusion velocity of 1~20 m/min. The subsidiary extruder 4 has the same extrusion temperature and extrusion velocity as those of the main extruder 2. The general extruder is used as the main extruder 2 and the subsidiary extruder 4.

Then, the obtained extrudate, which was obtained through the main extruder 2 and the subsidiary extruder 4, is cooled by the cooler 7, and is cut into the transparent chips 9 having a designated size by the cutter. Thereby, the transparent chips 9 having the same specific gravity as that of a base material of an artificial marble, to which the transparent chips 9 are applied, are manufactured.

The above transparent chips 9 manufactured by co-extrusion have a diameter of 3~20 mm, and preferably a diameter of 8~15 mm, and have a length of 3~20 mm, and preferably a length of 5~12 mm. The thickness of the external high specific gravity layer 11 coated on the internal transparent layer 10 of each of the transparent chips 9 is adjusted according to the specific gravity and the amount of the used filler.

Generally, the transparent chips 9 obtained by the cutter 8 has a length of 5~12 mm for determining the size of the transparent chips 9. When the transparent chips 9 need to have a smaller size, the transparent chips 9 are crushed again, and then the obtained small chips are classified according to length.

The conditions of co-extrusion are controlled according to the plasticity of the resin. The conditions of co-extrusion can be controlled to be equal to those of conventional extrusion.

The cross sections of the transparent chips 9 obtained by co-extrusion may have any shape, such as a circular, triangular or rectangular shape, which can be formed by the extruder. Generally, the appropriate shapes of the cross sections of the transparent chips 9 are circular, triangular and rectangular shapes. An artificial marble, which is manufactured using the transparent chips 9 having these shapes, obtains an excellent in terms of appearance and effect.

Figure 3:
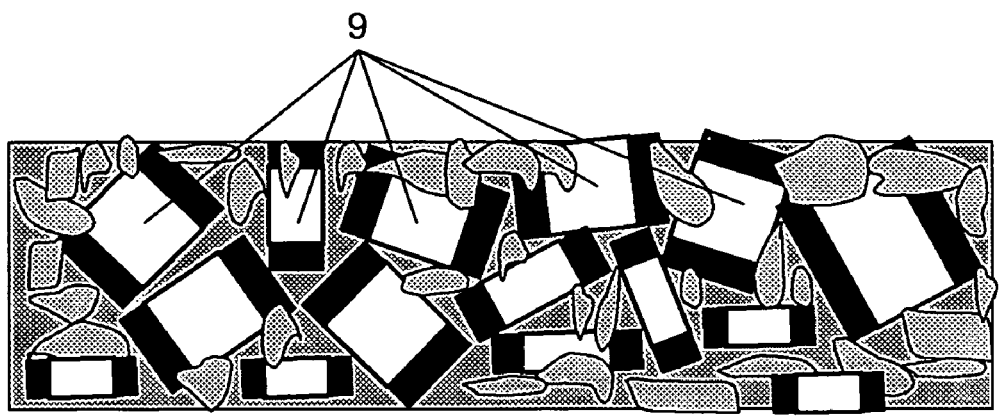
FIG. 3 is a sectional view of an artificial marble cast using the transparent chips in accordance with the embodiment of the present invention.

Thereafter, the transparent chips 9 manufactured by the above method are additionally mixed with a raw material composite for the artificial marble, and the mixture is cast into an artificial marble plate, as shown in FIG. 3. The amount of the transparent chips 9 mixed with the raw material composite for the artificial marble is 1~50% by weight of the total amount of the raw material composite, and is preferably 5~20% by weight in consideration of the appearance effect and plasticity of the obtained artificial marble.

Figure 4:
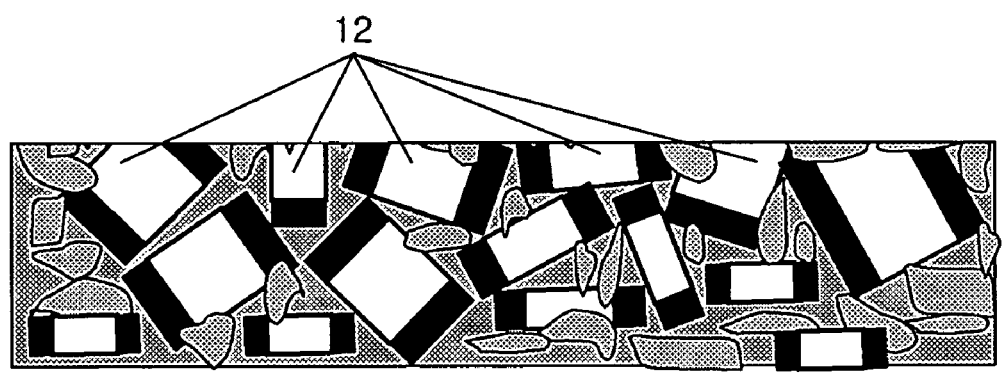
FIG. 4 is a sectional view of a finished product of the artificial marble obtained by hardening and sanding the artificial marble of FIG. 3, so that the transparent chips are exposed to the surface of the finished product.

Thereafter, the artificial marble plate is hardened, and the surface of the artificial marble plate is sanded, thereby producing a finished product of the artificial marble provided with the surface to which the sanded transparent chips 12 are exposed, as shown in FIG. 4.

FIG. 4 illustrates the surface of the above-manufactured acrylic artificial marble, after the hardening and sanding of the artificial marble. As shown in FIG. 4, the transparent chips 12 together with the filler and other chips are uniformly dispersed in the artificial marble without the occurrence of chip separation due to a difference of specific gravities. Accordingly, the transparent chips 12 exhibit a transparent effect like quartz in a natural marble, and thus, the manufactured artificial marble has a pattern similar to the natural marble or granite.

Figure 5:
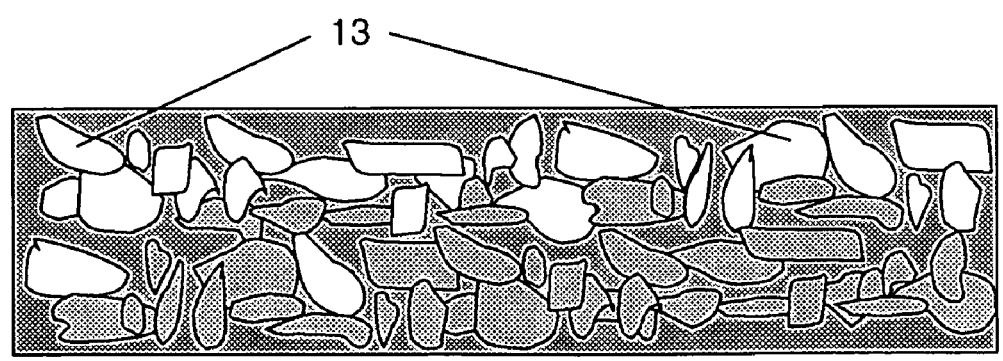
FIG. 5 is a sectional view of a conventional artificial marble using transparent chips made of a single component.

On the other hand, as shown in FIG. 5, in a conventional artificial marble containing transparent chips 13 made of a single component, the transparent chips 13 are separated from the filler or other chips due to a difference of specific gravities.

In FIGS. 3 to 5, small gray pieces represent general chips.

EXAMPLE

Zn-stearate, serving as a release agent for co-extrusion, at an amount of 0.5 parts by weight was added to acrylic resin at an amount of 100 parts by weight, thus producing an internal transparent resin composite. The internal transparent resin composite was supplied to the main extruder through the main extruder hopper at a temperature of 25° C. and was co-extruded in the main extruder at a velocity of 5 m/min, thus forming an internal transparent layer (specific gravity: 1.19 g/cm$^3$, light transmittance: 95%).

In order to adjust the specific gravity of the internal transparent layer, barium sulfate (specific gravity: 4.499 g/cm$^3$) at an amount of 150 parts by weight was added to acrylic resin at an amount of 100 parts by weight, and the mixture was co-extruded in the subsidiary extruder at the same temperature and velocity as those of the main extruder, thus forming an external layer (specific gravity: 3.175 g/cm$^3$). Then, the composite having the internal transparent layer and the external layer was molded by an extrusion molding die having a diameter of 15 mm, was cooled, and was cut into pieces having a length of 12 mm, thereby manufacturing transparent chips for an artificial marble.

The transparent chips manufactured by the above method had specific gravity of 1.61 g/cm$^3$. When the transparent chips at an amount of 10% by weight were supplied to manufacture the artificial marble, chip separation did not occur due to a difference (±0.1 g/cm$^3$) of specific gravities. Accordingly, a good product of the artificial marble was obtained.

INDUSTRIAL APPLICABILITY

Conventional acrylic artificial marbles are made of combination of various-colored opaque or semi-transparent chips. Since the chips cannot imitate transparent quartz or silica of a natural marble, the conventional artificial marbles are monotonous compared to the natural marble. Particularly, the conventional artificial marbles containing the opaque or semi-transparent chips have a limit of expressing a color and a pattern.

In order to solve the above problem, the present invention provides an acrylic artificial marble containing transparent chips, each obtained by forming a relatively high-specific gravity resin layer on the outer surface of a relatively low-specific gravity transparent resin layer using co-extrusion, so that the transparent chips have the same specific gravity as that of a raw material composite for the artificial marble, and a method for manufacturing the same, thus not causing the occurrence of layer separation due to a difference of specific gravities and exhibiting the same transparent effect of quartz or silica in the natural marble. Accordingly, the artificial marble of the present invention expresses a similar pattern to that of the natural marble and has a luxury appearance.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. An artificial marble containing transparent chips, each comprising an internal transparent layer, and an external layer having a specific gravity higher than that of the internal transparent layer and formed on the outer surface of the internal transparent layer, wherein the whole specific gravity of the transparent chips is 1.3 to 2.0, and the size of the transparent chips is 3 to 20 mm.

2. The artificial marble as set forth in claim 1, wherein the whole specific gravity of the transparent chips is the same as that of a raw material composite for the artificial marble to which the transparent chips are applied or differs from that of the raw material composite for the artificial marble by ±0.2 or less.

3. The artificial marble as set forth in claim 1, wherein the specific gravity of the external layer is 1.5 to 10.

4. The artificial marble as set forth in claim 1, wherein the light transmittance of the internal transparent layer is 90 to 100%.

5. The artificial marble as set forth in claim 1, wherein a base resin used in the internal transparent layer and the external layer is one or more selected from the group consisting of acrylic resin, polyester resin, and polyethylene terephthalate (PET).

6. The artificial marble as set forth in claim 1, wherein the transparent chips are transparent acrylic chips using acrylic resin as a base resin.

7. The artificial marble as set forth in claim 1, wherein the external layer contains at least one filler selected from the group consisting of titanium dioxide, barium sulfate, aluminum hydroxide, calcium carbonate, silica, metal powders, and metal salts.

8. The artificial marble as set forth in claim 7, wherein the specific gravity of the filler is 2.5 to 10.

9. The artificial marble as set forth in claim 1, wherein the internal transparent layer contains a pearl pigment.

10. The artificial marble as set forth in claim 1, wherein the transparent chips have cylindrical or polyhedral shapes.

11. The artificial marble as set forth in claim 1, wherein the external layer is formed in whole or in part on the outer surface of the internal transparent layer.

12. The artificial marble as set forth in claim 1, wherein the amount of the transparent chips is 1 to 50% by weight of the artificial marble.

13. A process for preparing an artificial marble comprising:
 manufacturing transparent chips by forming an external layer having a specific gravity higher than that of an internal transparent layer on the outer surface of the internal transparent layer to obtain a product, and cutting and crushing the obtained product; and
 adding the transparent chips to a raw material composite for the artificial marble, wherein the whole specific gravity of the transparent chips is 1.3 to 2.0, and the size of the transparent chips is 3 to 20 mm.

14. The process as set forth in claim 13, wherein the specific gravity of the transparent chips is controlled to be equal to that of the raw material composite of the artificial marble or to differ from that of the raw material composite for the artificial marble by ±0.2 or less by adjusting the specific gravity and the amount of a filler added to the external layer.

15. The process as set forth in claim 13, wherein a resin composite for the internal transparent layer and a resin composite for the external layer are supplied to an extruder and are co-extruded in the extruder so that the external layer is coated on the outer surface of the internal transparent layer.

* * * * *

UNITED STATES PATENT AND TRADEMARK OFFICE
CERTIFICATE OF CORRECTION

PATENT NO. : 7,638,189 B2 Page 1 of 1
APPLICATION NO. : 11/376054
DATED : December 29, 2009
INVENTOR(S) : Sang-Hun Choi It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 186 days.

Signed and Sealed this

Ninth Day of November, 2010

David J. Kappos
*Director of the United States Patent and Trademark Office*